United States Patent [19]
Love

[11] Patent Number: 5,228,739
[45] Date of Patent: Jul. 20, 1993

[54] TRUCK CAP CLAMP

[75] Inventor: Dale Love, Nappanee, Ind.

[73] Assignee: Grrreat Creations, Inc., Nappanee, Ind.

[21] Appl. No.: 894,812

[22] Filed: Jun. 8, 1992

[51] Int. Cl.[5] .......................................... B60P 3/377
[52] U.S. Cl. ................... 296/100; 296/35.3; 296/167; 248/228; 248/316.6; 403/290; 403/373
[58] Field of Search ............ 296/164, 167, 35.3, 296/100; 248/228, 225.31, 231.1, 231.4, 231.5, 231.6, 316.6; 403/290, 373; 269/240, 249, 265, 153

[56] References Cited
U.S. PATENT DOCUMENTS

| | | | |
|---|---|---|---|
| 1,831,798 | 11/1931 | Alsaker | 248/228 |
| 1,834,183 | 12/1931 | Schenk | 248/228 |
| 4,846,431 | 7/1989 | Pflieger | 248/228 |
| 4,901,963 | 2/1990 | Yoder | 248/231.5 |
| 5,131,780 | 7/1992 | Love | 269/249 X |

*Primary Examiner*—Dennis H. Pedder
*Attorney, Agent, or Firm*—James D. Hall

[57] ABSTRACT

A clamp having a L-shaped body member and a U-shaped body member laterally shiftably connected relative to one another by a bolt. The bolt is threadably connected through aligned holes in the center of the two body members and adjusts the distance between them upon turning the bolt.

6 Claims, 2 Drawing Sheets

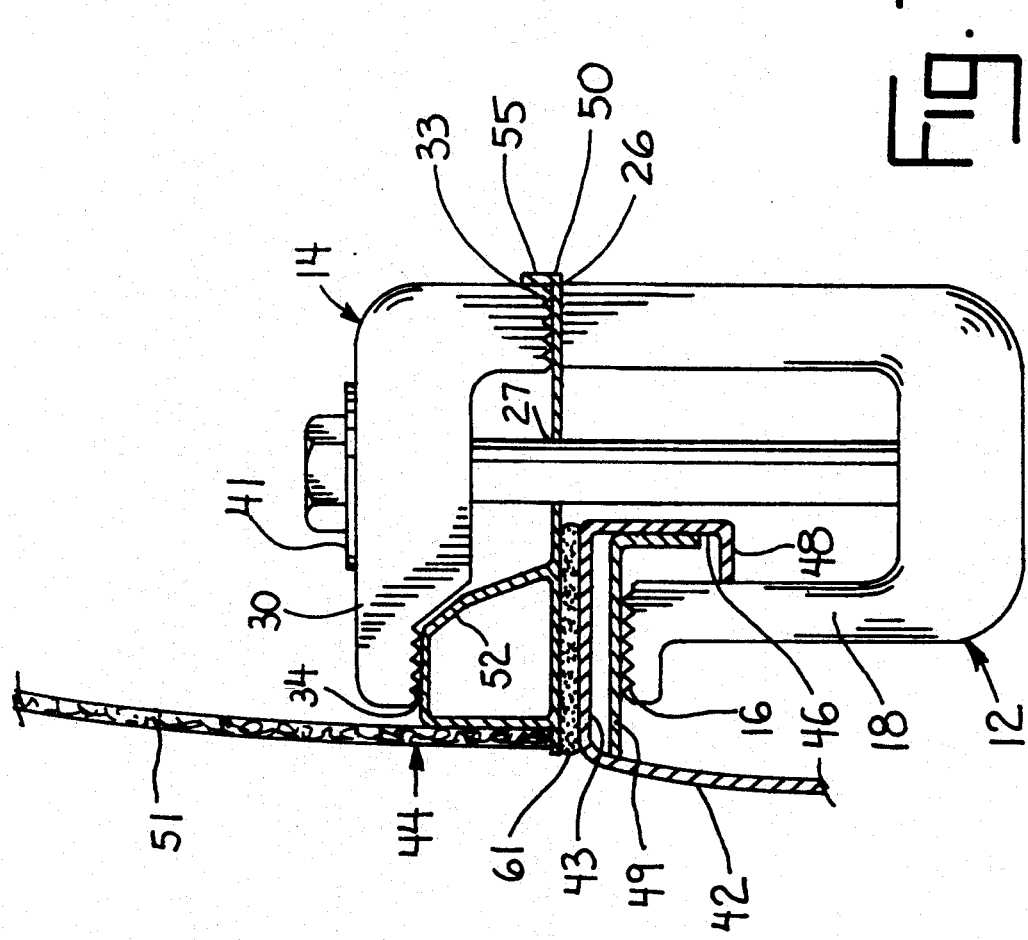

TRUCK CAP CLAMP

FIELD OF THE INVENTION

This invention relates to a clamp and will have relevance to a clamp for attaching a pickup truck cap to the truck bed.

BACKGROUND OF THE INVENTION

Truck bed caps commonly used on pickup trucks for enclosing the truck's bed are typically attached to the truck bed by a plurality of pivotal clamps.

Heretofore, the clamp included two clamping parts pivotally connected to one another and adjustable by a bolt. However, one problem associated with the use of this type of clamp is that due to the pivotal interconnection of the two clamp halves the clamping strength is weakened when the clamping surfaces are not substantially parallel as would be experienced when attempting to clamp thick objects together. Further, the cap may have a flange which extends inwardly from the truck bed side rail and which would prevent the clamping pods from gripping the cap and side rail.

SUMMARY OF THE INVENTION

This invention eliminates problems experienced with the previous truck bed clamps by providing a clamp having two pieces which are shifted latitudinally relative to one another by a connecting bolt. The clamp is generally C-shaped and is separated into an upper piece and a lower piece, each having two clamping pods, forming in a cooperating relationship two pairs of opposing pods.

The connecting bolt is inserted through the center of one piece and turned within the threaded bore in the center of the other piece. One pair of opposing pods of the clamp pieces are clamped about the cap flange and the other pair of opposing pods are clamped about the cap and truck bed side rail with the connecting bolt extending through the cap flange.

Accordingly, it is an object of this invention to provide for a novel clamp.

Another object of this invention is to provide for a clamp having two clamping surfaces shiftable relative to one another.

Another object of this invention is to provide for a clamp to secure a truck bed cap having a substantial lower flange to the side rail of a pickup truck bed.

Other objects of this invention will become apparent upon a reading of the following description taken with the accompanying drawings.

BRIEF DESCRIPTION OF THE DRAWINGS

FIG. 3 is a side elevational view of the clamp of this invention in use with a pickup truck bed side wall and cap shown in fragmented sectional form.

DESCRIPTION OF THE PREFERRED EMBODIMENT

Figure 2:
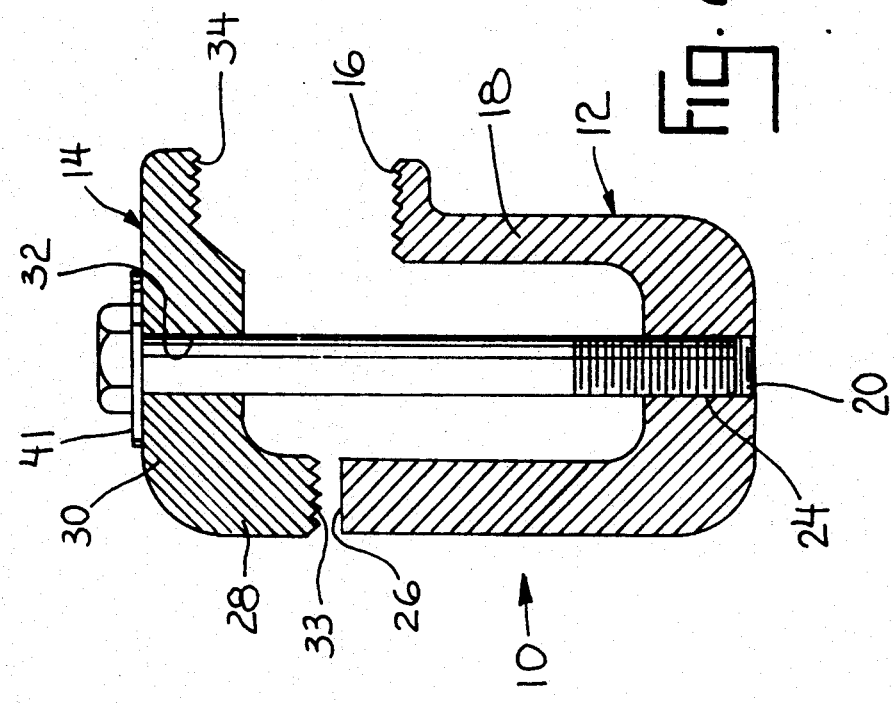
FIG. 2 is a vertical sectional view of the clamp.
Figure 1:
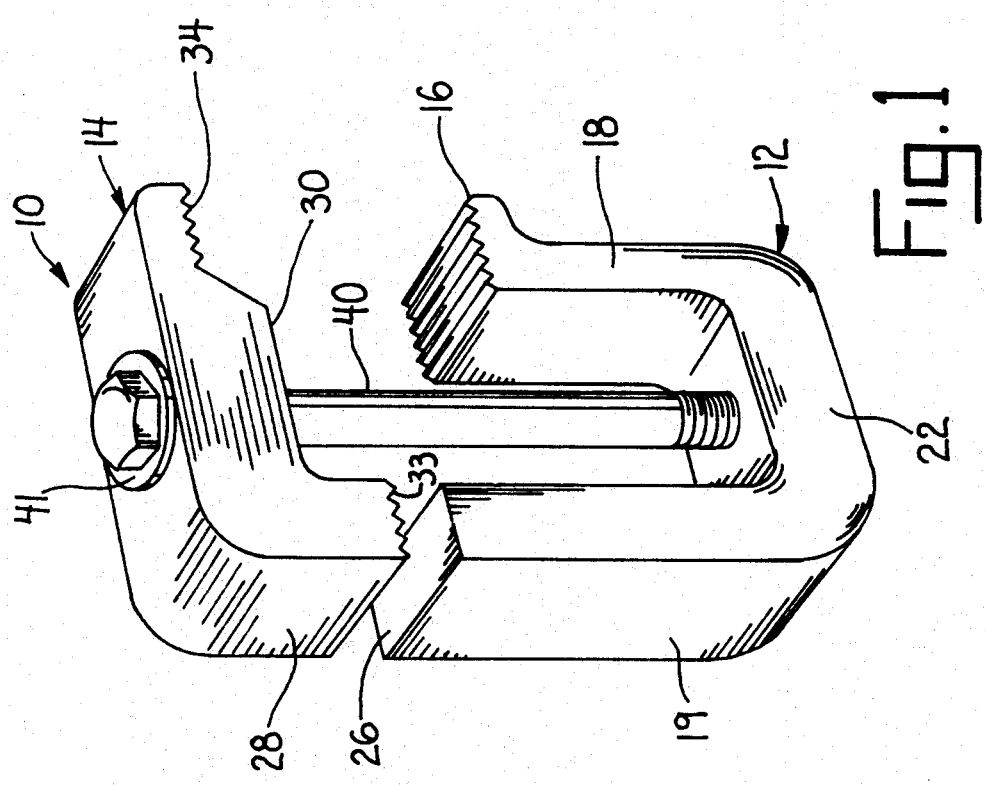
FIG. 1 is a perspective view of the clamp of this invention.

The preferred embodiment herein described is not intended to be exhaustive or to limit the invention to the precise forms disclosed. Rather it is chosen and described so that others skilled in the art can utilize its teachings.

Referring now to the drawings, clamp 10 is of a multiple piece construction, including a generally U-shaped lower body part 12 and a generally L-shaped body upper part 14. As illustrated, lower body part 12 includes an integral grooved clamping pod 16 at the free end of one leg 18. A bore 20 extends through the center of web 22 of lower body part 12. Bore 20 is internally threaded. The other leg 19 of part 12 includes a smooth flat clamping pod 26 at its free end.

Upper body part 14 includes a leg 28 and an arm 30. A bore 32 extends through the center of arm 30 as shown. A grooved clamping pod 34 is located at the free end of arm 30. A grooved clamping pod 33 is located at the free end of leg 28.

Clamping body parts 12 and 14 are interconnected by a bolt 40 having its shank extending through bore 32 of upper body part 14 and threadably accommodated within bore 20 of lower body part 12. A washer 41 is carried by bolt 40 and positioned between the head of the bolt and body part 14. Body parts 12 and 14 when interconnected by bolt 40 are positioned such that the two are in facing alignment with clamping pods 16 and 34 opposing one another and clamping pods 26 and 33 opposing one another.

FIG. 3 illustrates the use of clamp 10 in association with a vehicle, such as a pickup truck bed side rail 42 and a truck cap 44 shown in fragmented sectionalized form. Side rail 42 forms a common, well known part of the side of the bed of a truck. Seated upon the side rails of the truck is truck cap 44, commonly used to enclose the truck bed. Cap 44 has an outer shell 51 which is secured to a lower reinforcement flange 50. Flange 50 includes a corner web 52 which strengthens the lower corners of the cap. Flange 50 terminates in an upturned lip 55. It should be noted that, as typical, truck bed side rail 42 includes a horizontal wall 43, an inner down-turned flange 46 and an inturned lip 48. A horizontal L-shaped bracket 49 is connected to side rail flange 46. It is typical that a resilient seal 61 made from material such as sealant foam or rubber be located between the truck cap flange 44 and side wall rail 42 as illustrated. Cap flange 50 includes a hole 27 to accommodate bolt 40 of clamp 10.

The clamp is positioned between the truck cap and side rail with clamping pods 16 and 34 engaging bracket 49 and web 52 respectively and with clamping pods 26 and 33 engaging flange 50, as seen in FIG. 3. Bolt 40 is then inserted through upper body part bore 32 and cap flange hole 27, and turned in bore 20 of lower body part 12. When so appropriately positioned, bolt 40 is turned within threaded bore 20 to draw pods 16 and 34 toward each other to clamp the truck bed rail 42 and cap 44 together. Also as bolt 40 is turned within threaded bore 20, clamping pods 33 and 26 are drawn toward each other and clamp flange 50 between them.

It should be understood that the invention is not to be limited to the precise forms disclosed above but rather may be modified within the scope of the appended claims.

I claim:

1. In combination, a clamp comprising a body having first and second body parts, said first body part including a first clamping pod and a spaced second clamping pod, said second body including a first clamping pod and a spaced second clamping pod, said first clamping pod of said first body part and said first clamping pod of said second body part being opposed from each other, said second clamping pod of said first body part and said second clamping pod of said second body part being opposed from each other, a rotatable fastener device extending between said first and second body parts and constituting means upon rotation for moving said opposed clamping pods toward each other, a vehicle having a bed side rail and a vehicle bed cap supported upon said side rail, said bed cap including a lower inwardly extending flange, said flange having an opening, said first clamping pod of said first body part engaging said bed cap and said first clamping pod of said second body part engaging said bed side rail, said second clamping pod of said first body part and said second clamp pod of said second body part engaging opposite sides of said bed cap flange with said fastener device extending through said flange opening, wherein rotation of said fastener device causes said first clamping pods to clamp said bed cap to said bed side rail and said second clamping pods to clamp said bed cap flange between them.

2. The combination of claim 1 wherein said fastener device is positioned between both said first clamping pods and said second clamping pods.

3. The combination of claim 2 wherein said first body part has an arm and a depending leg, said first clamping pod of said first body being located on one end of said arm, said second clamping pod of said first body being located on one end of said leg, said second body part having first and second generally parallel legs, said first clamping pod of said second body part being located on one end of said first leg, said second clamping pod of said second body part being located on one end of said second leg.

4. The combination of claim 3 wherein said second body part is U-shaped in which said first and second legs thereof are integrally connected by a web, said fastener device engaging said first body part arm and said second body part web.

5. The combination of claim 4 wherein said fastener device is a threaded bolt, said second body part web having a threaded bore, said bolt being inserted through said first body part into said bore for moving said opposed clamping pods toward each other upon rotation of the bolt.

6. The combination of claim 1 wherein said vehicle includes a seal positioned between said vehicle bed side rail and said vehicle bed cap.

* * * * *